July 6, 1965 G. MORESSEE ETAL 3,193,715
ELECTRICAL MACHINE HAVING LAMELLAR WINDINGS
AND PLANAR AXIAL AIR GAP
Filed Feb. 4, 1963 3 Sheets-Sheet 3

INVENTORS
Georges Moressee
Robert Dechet
BY
Pierce, Scheffler & Parker
ATTORNEYS

3,193,715
ELECTRICAL MACHINE HAVING LAMELLAR WINDINGS AND PLANAR AXIAL AIR GAP
Georges Moressee, Neuilly-sur-Seine, and Robert Dechet, Boulogne-sur-Seine, France, assignors to Compagnie Electro-Mecanique, Paris, France, a corporation of France
Filed Feb. 4, 1963, Ser. No. 256,068
Claims priority, application France, Feb. 8, 1962, 887,394
8 Claims. (Cl. 310—268)

The present invention relates to an improvement in the construction of dynamo electric machines of the type having a planar axial air gap between the rotating and stationary members of the machine, the armature which may be either the stationary or rotating member of the machine being constituted by an annular disc of insulating material having lamellar type windings in the form of half-turns established on both faces thereof by a printed circuit technique or simialr process, and the half-turns on both faces being interconnected to form the complete windings. For a direct current machine of the general type described, brushes are provided which run in direct surface contact with the bare conductors which form the armature windings. For best commutation, those portions of the bare conductors which are to establish contact with the brushes are given a rectilinear configuration, the remainder of the conductors forming the half turns being curved, and the conductors are given a sufficient width to provide a satisfactory commutation surface.

The wear and heating of the brushes increase with the relative linear speed of the conductors with respect to the brushes and since this speed is a function of the mean diameter of the commutated portion of the conductors, it is, of course, desirable to establish this mean diameter as small as possible. The present invention has this for its general object, i.e. to provide a circular commutation track with rectilinear commutating parts of the armature conductors, this track having a very small and favorable mean diameter for the circle defining the line of contact between the brushes and armature conductors, and the improved construction being also favorable from an overall point of view in relation to its structural strength. Another advantage of the improved construction is that the commutating part of the armature disc is quite rigid, this part being backed up by a rigid supporting surface which therefore provides for a most satisfactory commutating effect since the contact area between the brushes and the rectilinear commutating parts of the conductors remain plane at all times.

The improved machine in accordance with the invention is thus characterized in that at most, one half of the conductors on one face of the annular armature disc are utilized to establish a commutation track adjacent the inner edge of the disc and are extended for that purpose toward the center of the disc by widened and substantially rectilinear portions having a radial or slightly inclined direction, these conductors alternating with those which do not participate in the constitution of the commutation track in such manner that each of them is interposed between two of these latter, or between two of their groups. A further feature of the invention is that at least one conductor out of two of those which do not participate in the constitution of the track is elongated slightly in the direction of the center of the disc. A further feature of the invention is that the electrical connections between ends of corresponding conductors of one and the other face of the armature disc are alternately arranged on either side of the commutation track. Still another feature of the inveniton is that the radially inner portion of the annular armature disc on which the commutation track is formed rests upon and is backed up by an annular insulating portion of a core or hub on which the armature disc is mounted thus reinforcing the armature disc mechanically and assuring good commutation because of the always plane contact area between brushes and armature conductors.

The foregoing objects and advantages of the invention will become more apparent from the following detailed description of several representative embodiments thereof and from the appertaining accompanying drawings. In the drawings:

FIG. 5 is also an enlarged view showing a modified construction for the commutation track portion of the armature disc; and FIG. 6 is a view similar to FIG. 5 showing a further modification of the commutator track construction.

Figure 1:
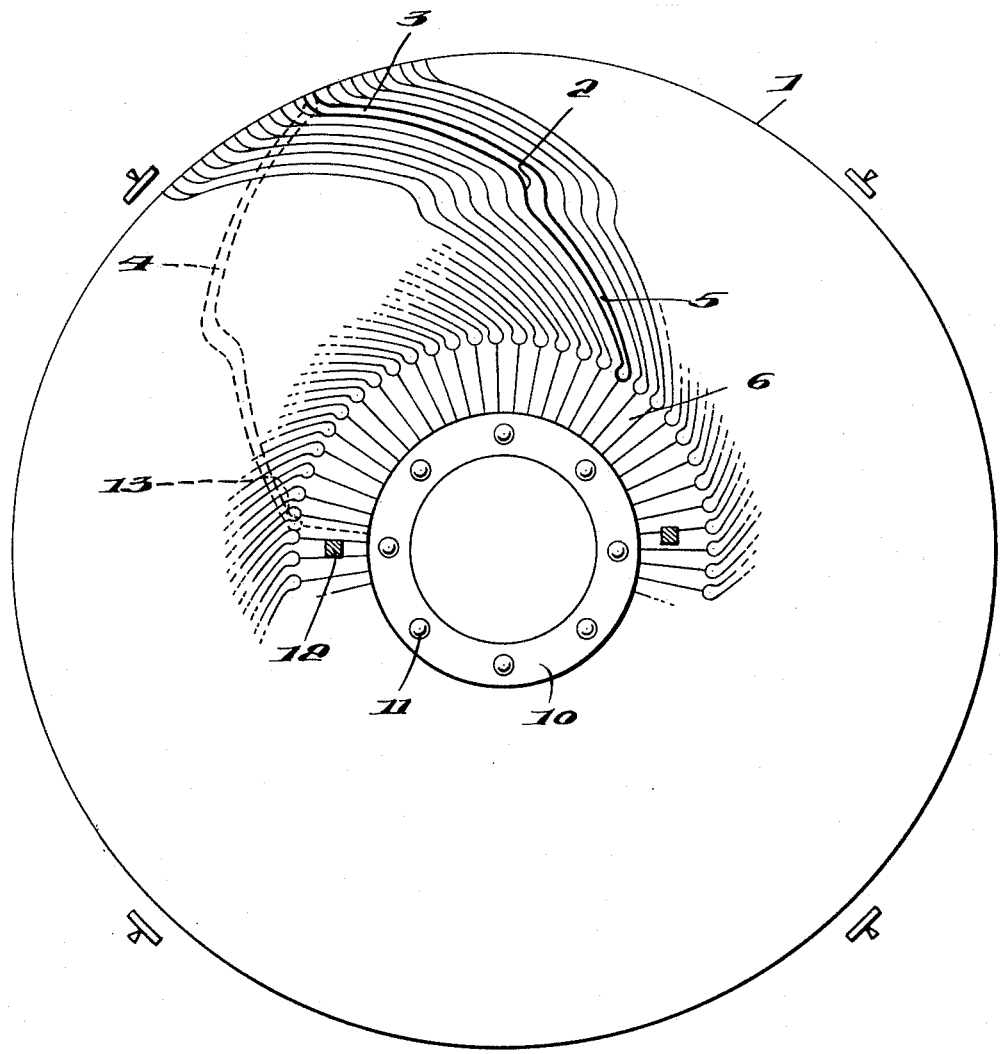
FIG. 1 is a view of the improved armature disc construction in plan.
Figure 2:
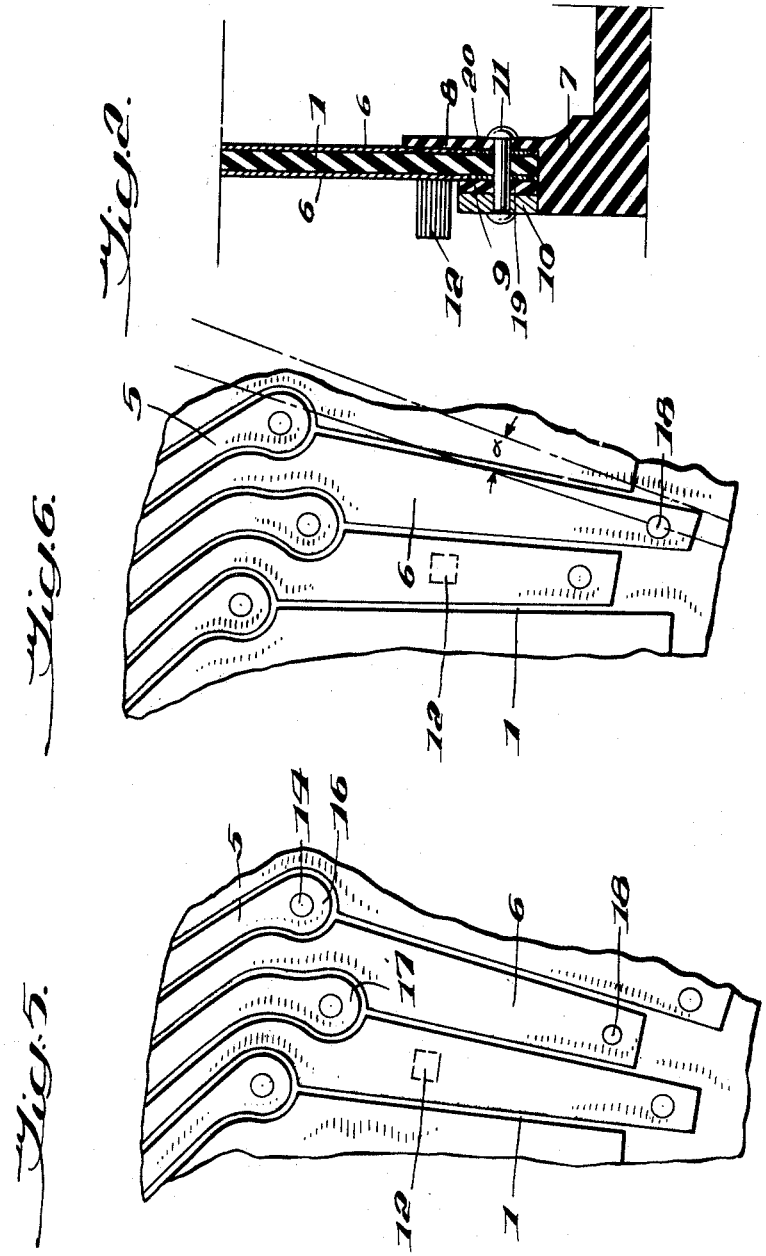
FIG. 2 is a partial view of the armature in axial section showing the manner in which the disc is attached at its inner peripheral portion to the supporting hub.

With reference now to FIGS. 1 and 2, the armature member of the dynamo electric machine is seen to be comprised of an annular disc 1 made from a suitable electrical insulating material. On each face of this disc is established an array of lamellar half-turn windings and the two arrays of half-turns are interconnected so as to form complete turns. The metal conductor material which constitutes the half turns can be applied to the opposite faces of the insulating disc 1 by known techniques such as by printing or by photoengraving. The armature disc 1 is associated with an inductor element so as to provide relative rotation therebetween but this inductor element has not been illustrated since the present invention is directed to only an improvement in the armature element itself. As an example, however, of the manner in which the present invention can be utilized in a complete motor assembly, reference is made to our co-pending United States patent application Serial No. 16,327 filed March 21, 1960, now Patent No. 3,077,548. As previously explained, the armature disc 1 may constitute the rotor element of the machine and the inductor element the stator, or the disc 1 may be stationary and the inductor arranged for rotation.

Each half turn on each face of disc 1 is constituted by three conductor portions, all forming, however, parts of the same conductor. One conductor portion 2 located generally at a position intermediate the inner and outer edges of the annular disc 1 is seen to be rectilinear. Extending outwardly from one end of the rectilinear portion 2 is a curving portion 3 which reaches out to the outer edge of disc 1 and is there electrically connected with the corresponding curving portion of the half turn 4 on the opposite face of the disc, as illustrated in broken lines. Extending inwardly from the opposite end of each rectilinear portion 2 in the general direction of the inner edge of disc 1 is another curving portion 5.

In accordance with the invention, for example, the inwardly extending portion 5 of every other half turn is extended rectilinearly and substantially radially inward toward the center of the disc 1. These rectilinear extensions are indicated at 6 in FIGS. 1 and 2, and together form a circular commutation track located very close to the inner edge of the annular disc 1 at which the relative speed between the brushes and the commutation track is an optimum minimum. With prior known constructions, it has been the practice to establish the commutation trackway at a much larger radius corresponding generally to the position of the intermediate rectilinear portions 2 of the half turns, thus involving a correspondingly greater relative speed between the brushes and the armature conductors and therefore correspondingly greater wear and heat effects.

As shown in FIG. 2, the radially inner portion of disc 1 corresponding to the location of the commutation trackway formed by the conductor portions 6 is mounted flush against the insulating flange portion 8 of a supporting hub 7, the disc 1 being secured in place by rivets 11 which pass through the disc and flange portion 8 and also through an insulating annular disc 9 which bears against the opposite face of disc 1 and a further annular disc 10 which bears against disc 9. The brushes which bear against and establish a sliding contact with the commutator conductor portions 6 are indicated at 12 and it will be noticed from FIG. 2 that these brushes 12 press against the inner part of disc 1 which is backed up by the flange 8. This makes the radially inner part of disc 1 substantially rigid and non-yielding when pressed upon by the brushes 12 thus assuring always a planar contact between the brushes and commutator portions 6 and therefore good commutation. The radially inner ends of the commutator conductor portions 6 terminate at a point radially inward of the periphery of the annular disc 9 but radially outward of the rivets 11. Spacer annular discs 19, 20 of insulating or metallic material on opposite faces of disc 1 have the same thickness as the commutator conductor portions 6 and these are located radially inward of the inner ends of the conductor portions 6 so as to establish a uniform overall width for the material to be clamped between disc 9 and the flange portion 8.

Figure 3:
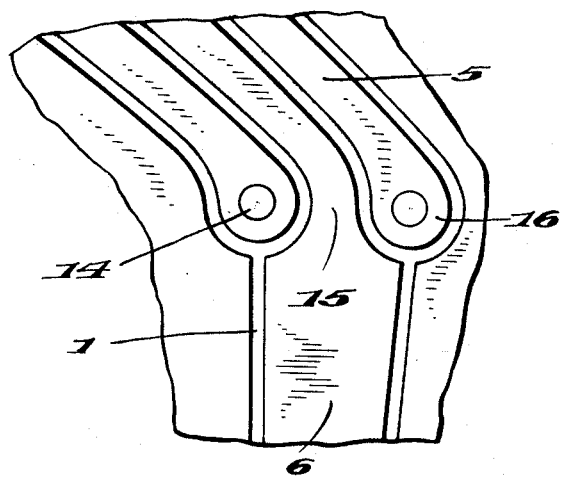
FIG. 3 is an enlarged view showing the details of the winding construction at the inner portion of the armature disc.

The ends of the half turns which are not provided with the rectilinear extensions or flat blades 6 that establish the commutation trackway thus terminate at the outer ends of the commutator extensions 6 and are electrically connected at those points by conductive connections 14, as shown in FIG. 3, which extend through apertures in the disc to points 13 on the half turns 4 on the opposite face as indicated in FIG. 1.

The improved construction, in which not more than half of the half turns on one face of the disc 1 form the commutation trackway has a twofold advantage. It permits one to establish a greater width for the commutator extensions 6, which width can in general then correspond to the width of the brushes, and at the same time it enables one to provide a commutator trackway having an optimum minimum radius. Moreover, the electrical connections between the half turn conductor elements on the opposite faces of disc 1, other than those at the outer peripheral edge of the disc, are distributed over at least two circumferences on either side of the commutation track.

Figure 4:
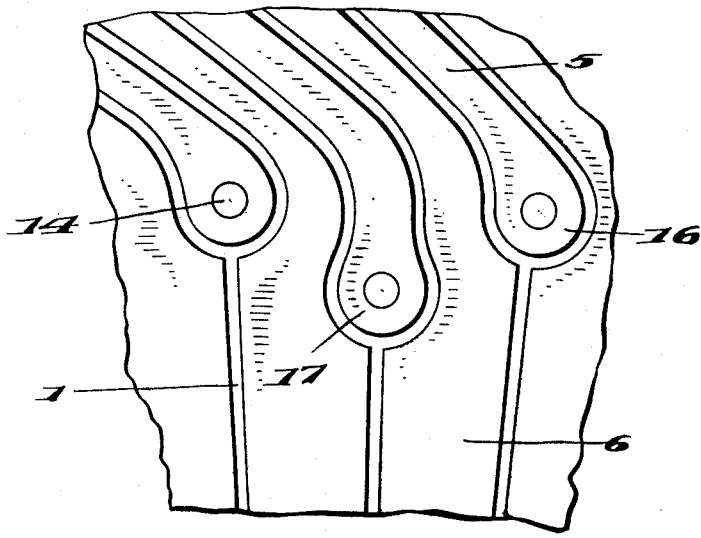
FIG. 4 is a view similar to FIG. 3 illustrating a modified construction for the radially inner parts of the winding.

The construction shown in FIG. 3 is not entirely without disadvantage since the conductor portions 6, before widening on the commutation track proper, present constrictions 15 at the circumference of the connections 14 of the ends 16 of two conductors 5 between which they are inserted. In order to remedy this, one may utilize a modified construction as shown in FIG. 4. Here it will be seen that the middle conductor out of each group of three which do not form the commutation trackway is extended radially inward beyond the ends of the adjacent conductors as at 17, thereby eliminating any constriction effect and moreover permitting one to increase the interval between two connections such as at 14. Because of this arrangement, the connections 14 between conductors on opposite faces of disc 1 can then be spread out over two different circumferences. The mechanical strength of disc 1 is thereby increased because the distance between the holes which contain the connections 14 is increased and the two rows of holes lie on circles of different radii.

The inner ends of the commutator extensions 6 are electrically connected to corresponding conductors on the opposite face of disc 1 by means of metal connections 18 which extend through correspondingly positioned holes in the disc, as shown in FIGS. 1 and 5. The metal connections 18 between adjacently positioned commutator extensions 6 are also arranged at different distances from the center of the disc 1 so that one half of them lie on a circle of one radius and the other half on a circle of a different radius. This, of course, increases the strength of the structure since the staggered effect of the holes in the disc through which the connections 18 pass provides in effect a greater distance between the holes than would be the case were all of them to be arranged along the same circle.

The commutator extensions 6 as illustrated in FIG. 5 extend radially inward. This may result in the creation of some noise due to the passage of each brush from one extension 6 to the next on the commutation trackway. The noise effect can be reduced by the arrangement shown in FIG. 6 wherein it will be noted that the commutator extensions 6 are no longer truly radial but are inclined at an angle $\alpha$ to a radius from the center of disc 1.

In conclusion, while we have disclosed in detail certain embodiments of the invention, it is to be understood that various modifications may be made in the construction and arrangement of component parts without, however, departing from the spirit and scope of the invention as defined in the appended claims.

We claim:

1. An armature for a rotatable electrical machine having a planar axial air gap between one face of the armature and an inductor element, said armature being comprised of an annular disc of insulating material having half turns of lamellar conductors applied to opposite faces thereof, said half turns on opposite faces being electrically connected at the inner and outer edge portions of said disc to establish complete winding turns, and a plane circular commutation track provided adjacent the inner edge of said disc on one face thereof for establishing electrical contact with brush means which extend to an external circuit, said commutation track being constituted by commutator extensions of not more than one half of the half turns on one face of said disc extending essentially radially inward, said commutator extensions being substantially rectilinear and having a width greater than the remainder of the correlated half turns, and said commutator extended half turns alternating with the other half turns which do not participate in the construction of the commutator track so that each of the former half turns is interposed between two of the latter half turns or between two of their groups.

2. An armature as defined in claim 1 wherein the middle positioned half turn of a group of three half turns which do not participate in the construction of the commutator track is extended further than the other two in the direction of the center of said disc.

3. An armature as defined in claim 1 wherein the middle positioned half turn of a group of three half turns which do not participate in the construction of the commutator track is extended further than the other two in the direction of the center of said disc, and the connections between the inner ends of adjacent half turns in said group and the inner ends of the related half turns on the opposite face of said disc are located at different distances from the center of said disc.

4. An armature as defined in claim 1 characterized in that the electrical connections between the ends of corresponding half turns of one and the other face of said disc are alternately arranged on either side of said commutation track.

5. An armature as defined in claim 1 and which further includes a supporting hub therefor, said hub including a flange portion arranged in direct contact with the inner peripheral portion of said disc containing said commutator trackway, and means securing said armature and hub together.

6. An armature as defined in claim 1 wherein said commutator extensions of said half turns are arranged radially with respect to the center of said disc.

7. An armature as defined in claim 1 wherein said commutator extensions of said half turns are arranged at a slight angle with respect to radii from the center of said disc.

8. An armature as defined in claim 1 wherein the electrical connections between adjacently positioned commutator extensions and the inner ends of the half turns on the opposite face of said disc are located at different distances from the center of said disc.

References Cited by the Examiner

UNITED STATES PATENTS

| | | | |
|---|---|---|---|
| 3,050,650 | 8/62 | Baudot | 310—268 |
| 3,093,762 | 6/63 | Baudot | 310—268 |
| 3,093,763 | 6/63 | Sargeant et al. | 310—268 |
| 3,116,431 | 12/63 | Baudot | 310—268 |

ORIS L. RADER, *Primary Examiner.*

MILTON O. HIRSHFIELD, *Examiner.*